US008363762B2

(12) United States Patent
Van de Wiel et al.

(10) Patent No.: US 8,363,762 B2
(45) Date of Patent: Jan. 29, 2013

(54) DIGITAL SUBSCRIBER LINE NOISE MITIGATION TECHNIQUES, AND APPLICATIONS THEREOF

(75) Inventors: Olivier Van de Wiel, Sunnyvale, CA (US); Koen Vanbleu, Bertem (BE); Jean Boxho, Woluwe St. Lambert (BE); Miguel Peeters, Woluwe St. Lambert (BE)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/103,336

(22) Filed: May 9, 2011

(65) Prior Publication Data

US 2011/0211624 A1    Sep. 1, 2011

Related U.S. Application Data

(63) Continuation of application No. 11/723,387, filed on Mar. 19, 2007, now Pat. No. 7,940,870.

(60) Provisional application No. 60/783,071, filed on Mar. 17, 2006.

(51) Int. Cl.
    *H03D 1/04* (2006.01)
(52) U.S. Cl. ....................................... 375/346
(58) Field of Classification Search ............... 375/346, 375/222, 226
    See application file for complete search history.

(56) References Cited

U.S. PATENT DOCUMENTS

| | | | |
|---|---|---|---|
| 7,809,076 B1 * | 10/2010 | Ghobrial et al. ............... | 375/285 |
| 2003/0123560 A1 | 7/2003 | Jacobsen et al. | |
| 2005/0157779 A1 | 7/2005 | Hasegawa et al. | |
| 2005/0286566 A1 | 12/2005 | Tong et al. | |
| 2006/0078044 A1 | 4/2006 | Norrell et al. | |
| 2007/0206625 A1 | 9/2007 | Maeda | |
| 2007/0230548 A1 | 10/2007 | Van de Wiel et al. | |

OTHER PUBLICATIONS

Armstrong et al., "Impulse Noise Mitigation for OFDM Using Decision Directed Noise Estimation", IEEE, ISSSTA2004, Sydney, Australia, Aug. 30-Sep. 2, 2004, pp. 174-178.
"ADSL Technology: Overview, line qualification and service turn-up", White Paper, ADSL Technology, JDS Uniphase Corporation 2005, 14 pgs.
"xDSL Modulation Techniques: Methods of achieving spectrum-efficient modulation for high quality transmissions", White Paper, Nextep Broadband, May 2001, 10 pgs.
Neelakanta et al., "Mitigation EMI in High-Speed Digital Transmission Networks, Part I", Compliance Engineering, www.ce-mag.com/archive/1999/novdec/Neelakanta.html, 1999, 13 pgs.
"7302 ISAM (Intelligent Services Access Manager): ADSL/ADSL2/ADSL2plus Network Compatibility Disclosure Document", Interface Specification ISAM Release 2.2, Edition 1, Apr. 2006, 37 pgs.
Litwin et al., "ADSL Technology Explained, Part 1: The Physical Layer", CommsDesign, Mar. 1, 2001, http://www.commsdesign.com/showArticle.jhtml?articleID=16502655, 9 pgs.

(Continued)

*Primary Examiner* — Kevin Kim
(74) *Attorney, Agent, or Firm* — Sterne, Kessler, Goldstein & Fox P.L.L.C.

(57) ABSTRACT

The present invention provides digital subscriber line noise mitigation techniques, and applications thereof. In an embodiment, the present invention provides a toolbox of methods and techniques for mitigating the effects of noise in xDSL systems. These methods and techniques are controllable and locatable at one or both ends of a DSL communication link (e.g., within a central office transceiver unit or a remote transceiver unit). These novel methods and techniques include: (1) per tone noise margin modification, (2) data framer constraints modification, (3) improved noise measurements; (4) more robust on-line reconfiguration processes, (5) worst case noise monitoring, (6) induced bit rate limitations, and (7) distortion noise mitigation. These methods and techniques are particularly useful for mitigating the effects of time-varying noise and impulse noise.

20 Claims, 5 Drawing Sheets

OTHER PUBLICATIONS

Litwin et al., "ADSL Technology Explained, Part 2: Getting to the Application Layer", CommsDesign, Apr. 2, 2001, http://www.commsdesign.com/showArticle.jhtml?articleID=16502772, 9 pgs.

Langlois, M.J., "ADSL Tutorial", University of New Hampshire InterOperability Laboratory, 121 Technology Drive, Suite 2, Durham, NH 03824 USA. Extracted from the Introduction and Chapter 1 of *A G.hs Handshaking Protocol Analyzer For ADSL*, a Master's Project (May 2002) 13 pages.

Nedev, N.H., "Analysis of the Impact of Impulse Noise in Digital Subscriber Line Systems", The University of Edinburgh, a Thesis submitted for the degree of Doctor of Philosophy (Mar. 2003) pp. i-xvii and 1-168.

\* cited by examiner

DIGITAL SUBSCRIBER LINE NOISE MITIGATION TECHNIQUES, AND APPLICATIONS THEREOF

CROSS REFERENCE TO RELATED APPLICATIONS

This application is a continuation of U.S. patent application Ser. No. 11/723,387, filed Mar. 19, 2007, now allowed, which claims the benefit of U.S. Provisional Patent Application No. 60/783,071, filed on Mar. 17, 2006, all of which are incorporated herein by reference in their entirety.

FIELD OF THE INVENTION

The present invention generally relates to broadband communications. More particularly, it relates to digital subscriber line noise mitigation techniques, and applications thereof.

BACKGROUND OF THE INVENTION

Digital subscriber line (DSL) technology is used to transform an ordinary telephone line (e.g., copper wire twisted-pair) into a broadband communication link. It works by sending signals over the telephone line in previously unused high frequencies.

Over the years, DSL technology has evolved into a family of specific, standardized implementations. These various implementations offer a variety of transmission speeds and transmission distances. It is common to refer to the various DSL implementations that have evolved over the years collectively as xDSL.

Each of the various xDSL implementations typically employs either carrierless amplitude and phase (CAP) modulation or discrete multi-tone (DMT) modulation. CAP modulation is closely related to quadrature amplitude modulation (QAM). CAP modulation produces the same form of signal as QAM without requiring in-phase and quadrature components of the carrier to first be generated. DMT modulation is a modulation method in which the available bandwidth of a communication channel is divided into numerous subcarriers or tones. Each tone of a DMT communication system is capable of acting as a communications sub-channel that carries information between a transmitter and a receiver.

A number of factors determine the performance of the various xDSL implementations. For example, the performance of any of the xDSL implementations is highly dependent on the local loop length (e.g., the length of a twisted-pair circuit between a central office and a customer) and the local loop condition. The local loop condition is affected by several factors such as, for example, line noise. Line noise may corrupt data-bearing signals as the signals travel along the line. As a result, the transmitted data-bearing signals may be decoded erroneously by a receiver because of this signal corruption.

In the case of DMT modulation, for example, the number of data bits or the amount of information that a tone carries may vary from tone to tone, and it depends on the relative power of the data-bearing signal compared to the power of the corrupting signal on that particular tone. A measure of the quality of a signal carried by a tone is the ratio of the received signal strength (power) over the noise strength in the frequency range of operation, or the Signal-to-Noise Ratio (SNR). High SNR results in high signal quality being carried by a tone. Another measure of signal quality is bit error ratio (BER) for a given tone.

In order to account for potential interference on the telephone line and to guarantee a reliable communication between the transmitter and receiver, each tone is typically designed to carry a limited number of data bits per unit time based on the tone's SNR using a bit-loading algorithm. The number of bits that a specific tone may carry decreases as the relative strength of the corrupting signal increases, that is when the SNR is low. Thus, the SNR of a tone may be used to determine how much data should be transmitted by the tone.

It is often assumed that the corrupting signal is a stationary additive random source with Gaussian distribution and white spectrum. With this assumption, the number of data bits that each tone can carry relates directly to the SNR. However, this assumption may not be true in many practical cases and there are various sources of interference that do not have a white, Gaussian distribution. Impulse noise is one such noise source. Time-varying noise is also an effect that makes the stationarity assumption impractical.

Bit-loading algorithms, which are methods to determine the number of bits transmitted per tone, are usually designed based on the assumption of stationary additive, white, Gaussian noise. With such algorithms, the effects of impulse noise and time-varying noise are misestimated resulting in an excessive rate of error. Furthermore, channel estimation procedures can be designed to optimize performance in the presence of stationary, additive, white, Gaussian noise, but are often poor at estimating impulse noise and time-varying noise. Consequently, DSL modem training procedures leave the modem receivers susceptible to impulse noise and time-varying noise.

What are needed are new DSL noise mitigation techniques that overcome the deficiencies noted above.

BRIEF SUMMARY OF THE INVENTION

The present invention provides digital subscriber line noise mitigation techniques, and applications thereof. In an embodiment, the present invention provides a toolbox of methods and techniques for mitigating the effects of noise in xDSL systems. These methods and techniques are controllable and locatable at one or both ends of a DSL communication link (e.g., within a central office transceiver unit or a remote transceiver unit). These novel methods and techniques include: (1) per tone noise margin modification, (2) data framer constraints modification, (3) improved noise measurements; (4) more robust on-line reconfiguration processes, (5) worst case noise monitoring, (6) induced bit rate limitations, and (7) distortion noise mitigation. These methods and techniques are particularly useful for mitigating the effects of time-varying noise and impulse noise.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention is described with reference to the accompanying drawings. The drawing in which an element first appears is typically indicated by the leftmost digit or digits in the corresponding reference number.

DETAILED DESCRIPTION OF THE INVENTION

The present invention provides digital subscriber line noise mitigation techniques, and applications thereof. In the detailed description of the invention herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
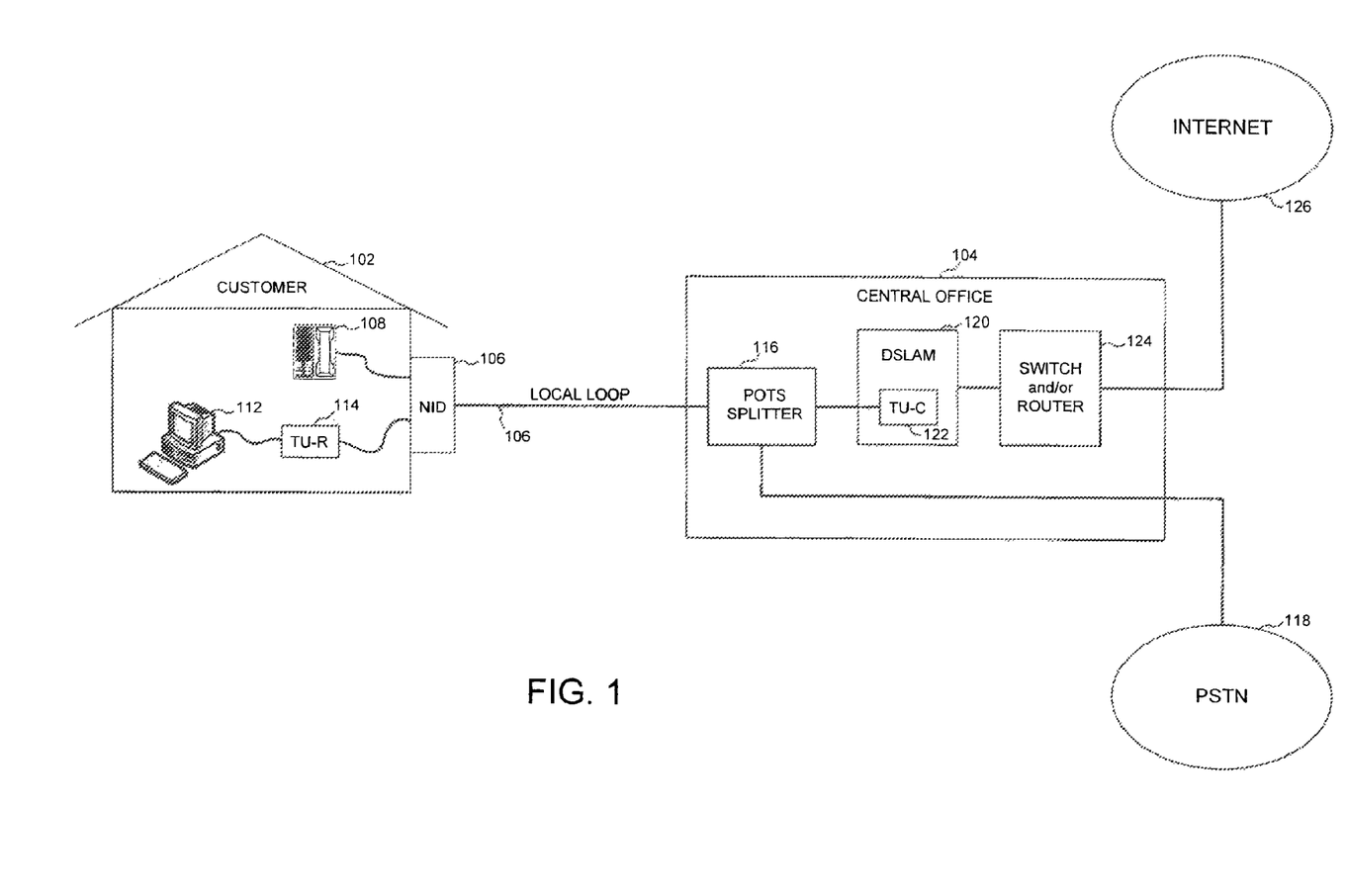
FIG. 1 is a diagram illustrating an example digital subscriber line architecture.

FIG. 1 is a diagram illustrating an example digital subscriber line (DSL) architecture 100. Architecture 100 includes a customer 102 connected to a central office 104 by a local loop 106. Local loop 106 is used to provide DSL service to customer 102.

As shown in FIG. 1, a baseband service terminal (such as a POTS or an ISDN terminal) 108 can connect to local loop 106 using network interface device (NID) 110. A computer 112 can connect to local loop 106 using NID 110 and a local loop remote end modem or transceiver unit-remote (TU-R) 114. A signal splitter (not shown) within NID 110 is used to pass low frequency baseband signals to terminal 108 and high frequency data signals to TU-R 114. The signal splitter includes filters designed to diplex signals onto local loop 106, and they have stopband impedance characteristics that minimize the effect of changing baseband service 108 signal characteristics. This allows customer 102 to use local loop 106 as a communication link for both baseband service and for broadband data service.

Central office 104 includes a signal splitter 116, a DSL access multiplexer (DSLAM) 120, and a switch/router 124. Signal splitter 116 passes low frequency telephone signals received from telephone 108, over local loop 106, to the baseband service network (PSTN or ISDN) 118. High frequency data signals received over local loop 106 are passed to DSLAM 120. DSLAM 120 includes a plurality of central office modems or transceiver units-central office (TU-C) 122 (i.e., one TU-C for each customer 102) arranged in a bank configuration. From DSLAM 120, the high frequency data signals are sent to switch/router 124 and transmitted over internet 126. Signals from ISDN/PSTN 118 and internet 126 to customer 102 are sent by central office 104 to customer 102 over local loop 106.

For residential and commercial customers 102 with a need for broadband data access, but who do not typically send large data streams, the DSL service provided is typically asymmetric DSL (ADSL) service. This service is so named because the data rate sent to customer 102 is much greater than the data rate sent by customer 102. Other customers 102, who need to send large data streams are typically provided a symmetrical xDSL service such as VDSL or SHDSL.

For the example of ADSL, the low frequency spectrum allocated for use by telephone 108 is from near DC to approximately 4 kHz. A frequency guard band is placed between this spectrum and the high frequency data spectrum to help avoid interference. The high frequency data spectrum starts above the telephone/ISDN 108 band and extends up to approximately 1.1 MHz. In embodiments, the lower part of the high frequency spectrum (i.e., the upstream spectrum) is used to send data from customer 102 to central office 104. The upper part of the high frequency spectrum (i.e., the downstream spectrum) is used to send data from central office 104 to customer 102.

Figure 2:
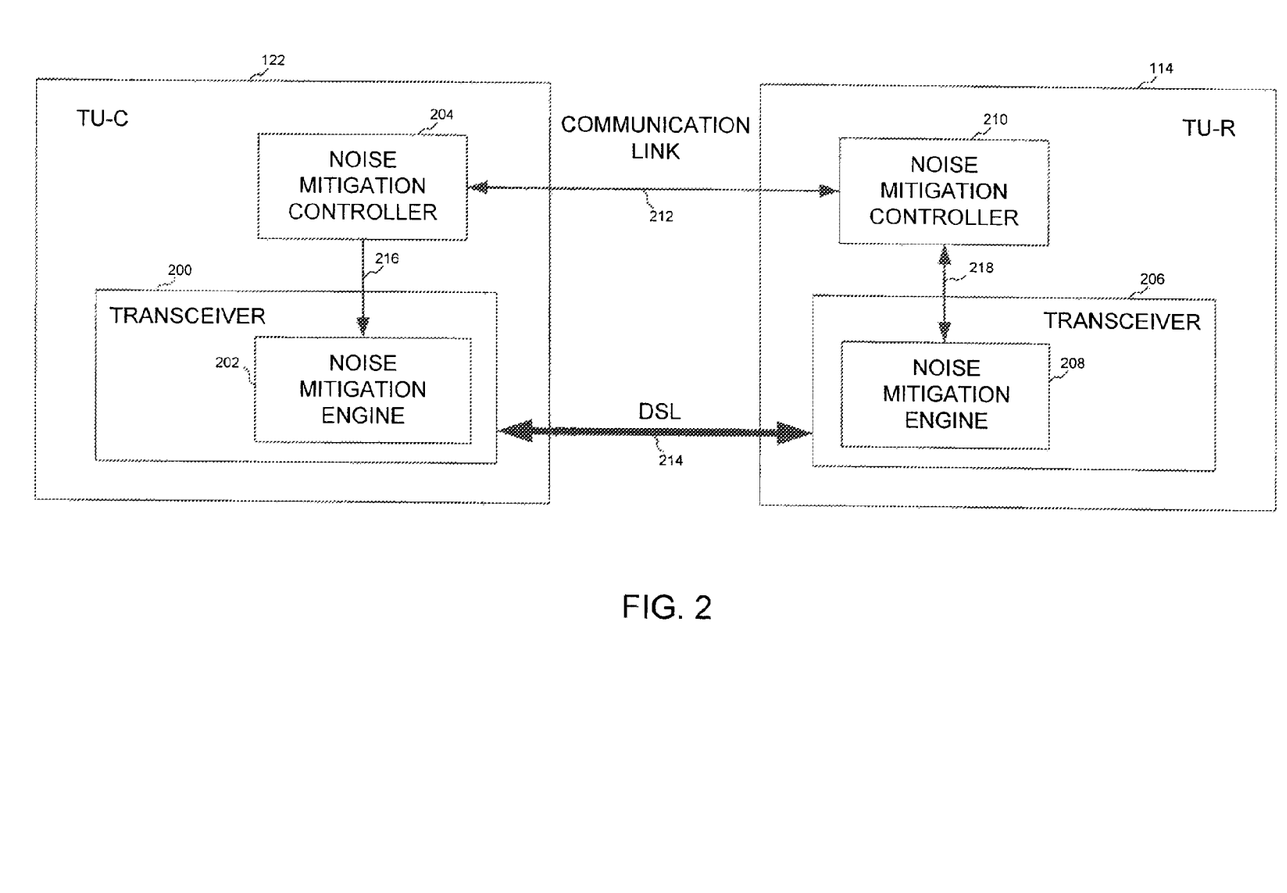
FIG. 2 is a diagram of a central office transceiver unit and a remote transceiver unit according to an embodiment of the present invention.

FIG. 2 is a more detailed diagram of TU-C 122 and TU-R 114 according to an embodiment of the present invention. As shown in FIG. 2, TU-C 122 includes a transceiver 200 that includes a noise mitigation engine 202 and a noise mitigation controller 204. Noise mitigation engine 202 communicates with noise mitigation controller 204 over communication link 216. TU-R 114 includes a transceiver 206 that includes a noise mitigation engine 208 and a noise mitigation controller 210. Noise mitigation engine 210 communicates with noise mitigation controller 208 over communication link 218. Noise mitigation controller 204 and noise mitigation controller 210 communicate with each other over communication link 212. Transceiver 200 communicates with transceiver 206 over DSL communication link 214. In an embodiment, communication link 212 is a reserved communication sub-channel of DSL communication link 214.

Noise mitigation engines 202 and 208 operate under the control of noise mitigation controllers 204 and 210 to improve the quality of DSL service provided between transceivers 200 and 208. The noise mitigation engines are necessary in order to provide a high quality of service because there are several types of interference that can potentially limit the performance of xDSL systems. These include, for example, additive white Gaussian noise interference, crosstalk interference, impulse noise interference, and radio noise interference. Additive white Gaussian noise is thermal noise, and it can cause symbol errors to occur at an xDSL receiver when noise pushes the received signal beyond a decision boundary. Crosstalk occurs because telephone cables contain many bundled wires (e.g., twisted pairs), each used by a different customer 102. The bundled wires radiate electromagnetically and can induce currents in other wires in the cable. Impulse noise is interference that is short in duration but relatively large in magnitude. It can be caused, for example, by power electronic devices, by a power surge that results when a device having a motor is started, or by lightening. Radio noise is interference due to a wireless source. The copper phone lines act as antennae and pick up this interference.

There are two types of crosstalk interference. Near-end crosstalk interference occurs when a transmitter interferes with a receiver located on the same end of the cable. Far-end crosstalk interference occurs when the transmitter interferes with a receiver on the opposite end of the cable. The effect of near-end crosstalk interference is different than far-end crosstalk interference because far-end crosstalk must travel the entire length of the cable and is attenuated when it reaches the receiver, the net effect of upstream and downstream being also determined by the power spectral density of cross-talk signals and coupling factor being frequency and cable dependent.

In addition to the above, bridged taps and line splices are also a source of signal perturbation that can potentially limit the performance of xDSL systems. A bridged tap is a section of wire connected to a local loop at one end and unterminated at the other end. When a transmitted signal arrives at a bridged tap, the signal divides. Part of the energy continues to the receiver and the rest of the energy reflects off of the unterminated end. This reflection causes delayed versions of the signal to arrive at the receiver, and these reflections distort the received signal causing both intersymbol interference and intrasymbol interference. Line splices have a similar effect.

A more detail description of the features and operation of TU-C 122 and TU-R 114 are provided below reference to FIGS. 3-5.

Figure 3:
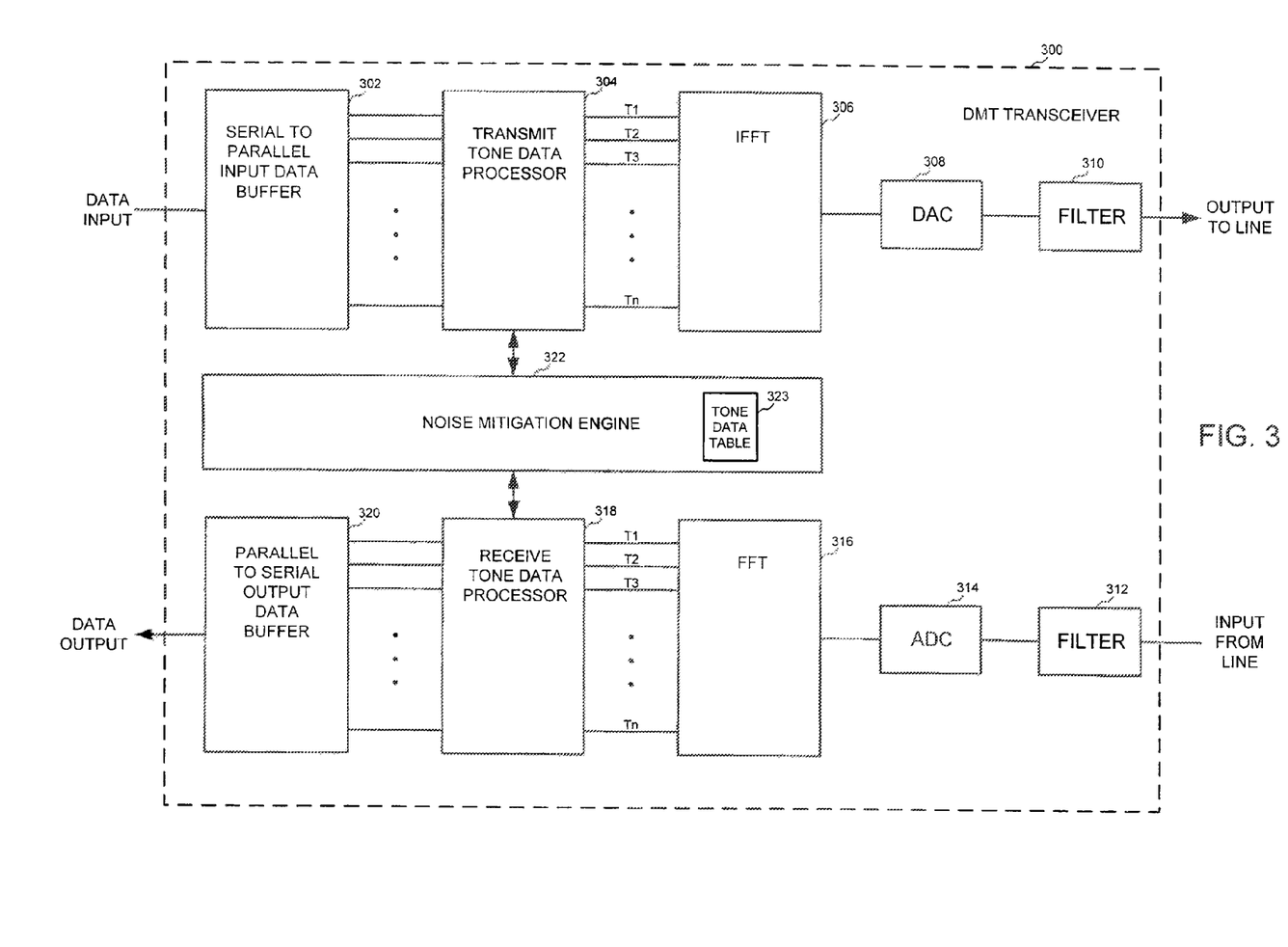
FIG. 3 is a diagram of a discrete multi-tone transceiver according to an embodiment of the present invention.

FIG. 3 is a diagram of a transceiver 300 according to one embodiment of the present invention. Transceiver 300 is a discrete multiple-tone (DMT) transceiver. As noted above, two types of modulation are typically used by xDSL systems: carrierless amplitude and phase (CAP) modulation and discrete DMT modulation. CAP modulation is closely related to quadrature amplitude modulation (QAM) and produces the same form of signal as QAM without requiring in-phase and quadrature components of the carrier to first be generated. DMT modulation transmits data on multiple subcarriers in a manner similar to the orthogonal frequency division multiplexing (OFDM) technique that is used in many wireless applications.

Transceiver 300 includes both a transmitter data path, a receiver data path and a noise mitigation engine 322. The transmitter data path includes a serial-to-parallel input data buffer 302, a transmit tone data processor 304, an inverse fast Fourier transformer (IFFT) 306, a digital-to-analog converter (DAC) 308, and a filter 310. The receiver data path includes a filter 312, an analog-to-digital converter (ADC) 314, a fast Fourier transformer (FFT) 316, a receive tone data processor 318, and a parallel-to-serial output data buffer Noise mitigation engine 322 includes a tone data table 323.

The transmitter data path of transceiver 300 takes in N data symbols in parallel and transmits the symbols on N subcarriers or tones (i.e., tones $T_1$ through $T_n$). The data rate on each tone is 1/N the original data rate. Reducing the data rate results in a DMT symbol period that is N times as long as the original symbol period. Increasing the symbol period can make the symbol longer than the channel response. This is used to mitigate the effects of intersymbol interference, or more generally the channel dispersion.

In addition to the above, transceiver 300 can perform dynamic bit allocation to make efficient use of the available channel capacity. This technique enables transceiver 300 to vary the number of bits per symbol for each tone based on the tone's signal-to-noise ratio (SNR). Tones with a low SNR transmit binary phase-shift keying (BPSK) or quadrature PSK (QPSK) because they are robust modulation formats. If the tone's SNR is very low, that tone will not be used to transmit data at all. Tones with a higher SNR transmit higher-order quadrature amplitude modulation (QAM) in order to achieve an increased throughput.

Like many other digital communication systems, xDSL systems employ error control coding to help mitigate the effect of noise such as, for example, additive white Gaussian noise and radio noise. This coding is performed by transmit tone data processor 304. The coding adds redundancy to the transmitted signal, which is used by a receiver to detect and correct errors.

In one embodiment, transceiver 300 employees three layers of coding. The innermost code is a convolutional code. Convolutional codes get their name because the encoding process can be viewed as the convolution of the message with the code's impulse response. The Viterbi algorithm is used at the receiver to decode the received sequence. Convolutional codes are good at correcting random errors. However, the nature of the decoding algorithm is such that the decoder can cause burst errors to occur if errors are made during the decoding process.

In an embodiment, a Reed-Solomon block code is used on top of the convolutional code. Reed-Solomon codes are good at detecting and correcting burst errors, such as those generated by the Viterbi decoder. Reed-Solomon code-word lengths of up to 255 bytes with the addition of up to 16 parity bytes can be used for each code word.

In an embodiment, the outermost code is a cyclic redundancy check (CRC) code. The CRC can detect errors, but it cannot correct them. The CRC code is used as a top-level error-detection mechanism in order to detect any errors that remain after Viterbi and Reed-Solomon decoding.

Transceiver 300 preferably employs interleaving in combination with coding to correct errors caused by impulse noise. The interleaving process rearranges data so that those samples that were located contiguously in time are spaced far apart. Impulse noise can cause a burst of errors that is hard for conventional decoders to correct. The use of interleaving combined with coding spreads out these errors in time to improve decoding performance.

Following coding by transmit tone data processor 304, the coded symbols are forwarded to IFFT 306. IFFT 306 generates orthogonal subcarriers. The data symbols are treated as being in the frequency domain and act as complex weights for the basis functions (orthogonal sinusoids at different frequencies) of the transform performed by IFFT 306. IFFT 306 converts the data symbols into a time-domain (e.g., sum of sinusoids) signal. The block of IFFT output samples is referred to as a DMT symbol. This time-domain signal is converted to an analogy signal by DAC 308, filtered by filter 310, and transmitted across DSL communication link 214.

In an embodiment, a 2N-point inverse fast Fourier transform is used to generate the DMT symbols, and the N negative-frequency inverse fast Fourier transform bins are the complex conjugate of the N positive-frequency bins. This symmetric spectrum results in a real time-domain signal. The DMT signal is centered at DC with the subcarriers around DC zeroed out (i.e., not used) to create a hole in the DMT spectrum in order to make room for the low frequency telephone signal.

DMT supports inclusion of cyclic prefix and postfixes. A cyclic prefix or postfix is a block of samples with a length L that is a replica of the last or first L samples of the DMT symbol. The prefix is transmitted first or last, followed or preceded by the 2N samples of the DMT symbol. The length L is chosen so that it will be longer than the length of the channel response, or in conjunction with the postfix length in a way that mimizes the effect of the channel dispersion. The cyclic prefix contains redundant information. However, the DMT receiver makes use of the presence of the prefix in order to mitigate the effects of the DSL communication link 214.

Figure 4:
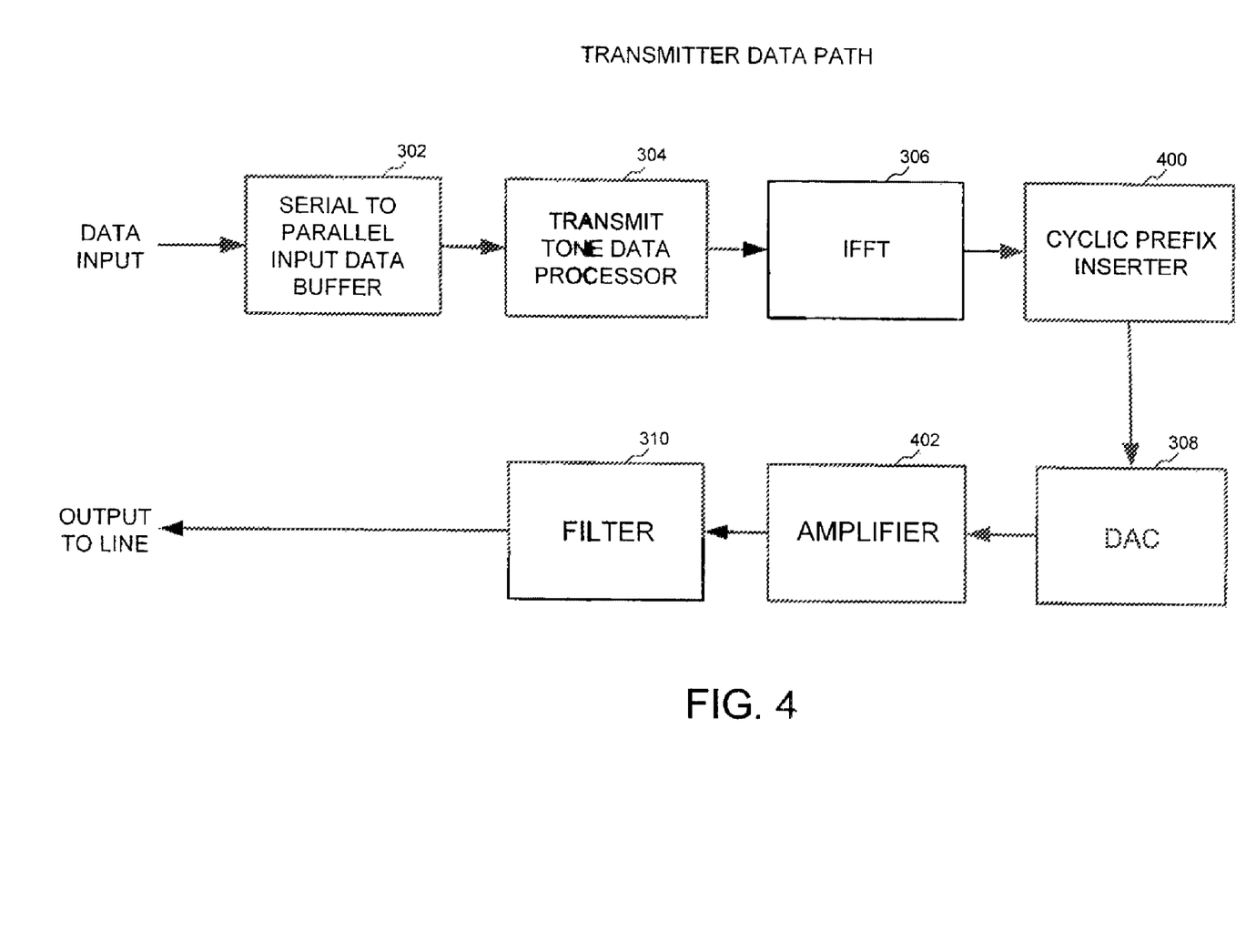
FIG. 4 is a diagram of a transmitter data path for the transceiver of FIG. 3.

FIG. 4 is a more detailed diagram of the transmitter data path of transceiver 300 according to an embodiment of the present invention. In the embodiment shown in FIG. 4, the transceiver data path includes serial-to-parallel input data buffer 302, transmit tone data processor 304, IFFT 306, a cyclic prefix inserter 400, DAC 308, an amplifier 402, and filter 310.

Referring to FIG. 3 again, input signals received by transceiver 300 are filtered by filter 312 and converted to digital signals by ADC 314. FFT 316 then transforms the digital time domain signals to frequency domain signals. Receive tone data processor 318 corrects transmission errors and reverses the coding process of transmit tone data processor 304 to form data that is written to parallel-to-serial output data buffer 310.

Figure 5:
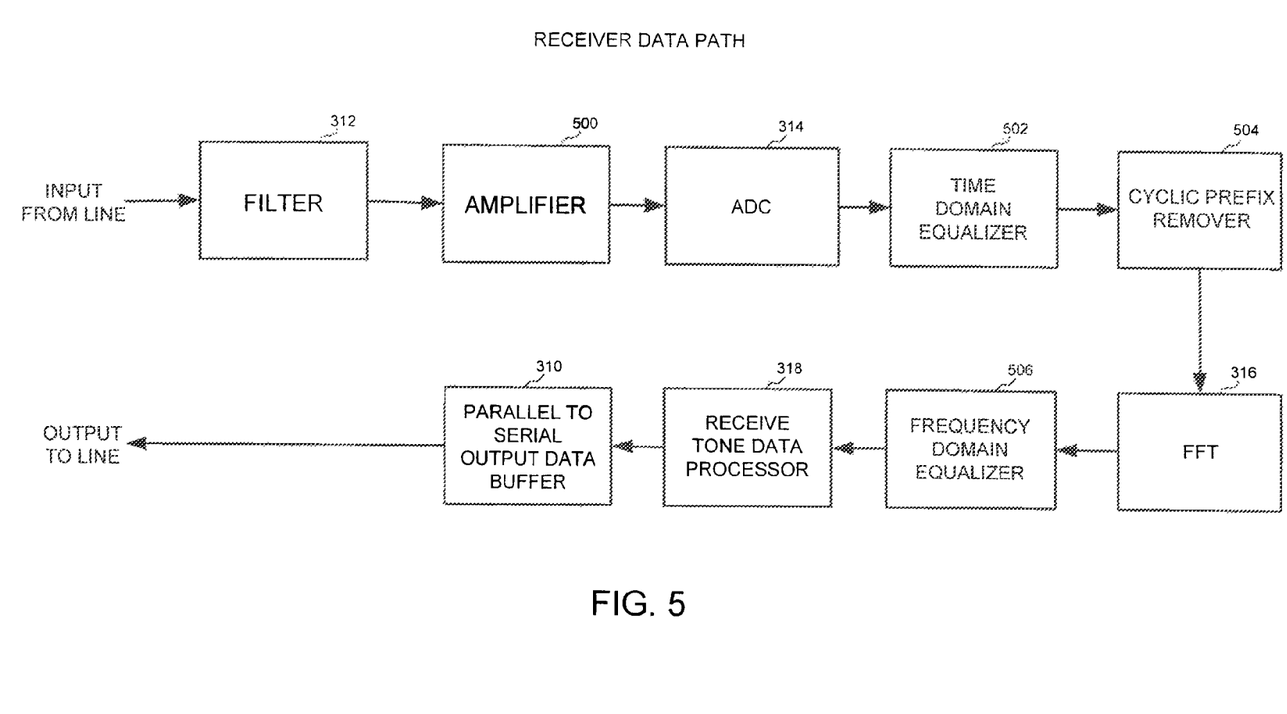
FIG. 5 is a diagram of a receiver data path for the transceiver of FIG. 3.

FIG. 5 is a more detailed diagram of the receiver data path of transceiver 300 according to an embodiment of the present invention. In the embodiment shown in FIG. 5, the receiver data path includes filter 312, an amplifier 500, ADC 314, a time domain equalizer 502, a cyclic prefix remover 504, FFT 316, an frequency domain equalizer 506, receive tone data processor 318, and a parallel-to-serial output data buffer 310.

Multicarrier systems such as the example system described above contain many simultaneous signals. If each signal's peak amplitude is represented by X, and all signals simultaneously reach peak signal level, the resulting level would be X*20 log(N), where N is the number of signals. The signals in such a system have a statistical nature, however, and can be treated as uncorrelated. Thus, the possible peak amplitude may be large, but the probability of this level occurring is low.

A peak-to-average ratio ($R_P$) is used to define the ratio between a signal's peak level and its average level over time. Most multicarrier systems use a modified definition for $R_P$ that is based on the statistical likelihood of exceeding a certain peak level (such as the probability of clipping in the DAC output). The $R_P$ value partially determines the operating parameters for DAC 308 and ADC 314.

Important parameters relating to the example DSL system described above are the $R_P$ factor, the number of bits per subcarrier or tone, and the signal-to-noise ratio (SNR). ADC 314 must take into account all of these parameters, plus additional bits of resolution for input noise (i.e., the receiver SNR is typically lower than transmitter SNR) and for possible echo energy. Typically one to two extra bits of resolution should be used in ADC 314.

Referring back to FIG. 2, during operation, when TU-R 114 is first connected to DSL communication link 214, TU-R 114 and TU-C 122 perform an initialization process. This process typically consists of four major phases. The first phase is a handshake phase. The second phase is a transceiver training phase. The third phase is a channel analysis phase. The fourth phase is a data exchange or showtime phase.

The handshake phase is used to determine the nature and capabilities of TU-R 114 and TU-C 122 and to indicate which protocol is to be used for the remainder of the initialization phase. The signaling method used for the handshake interchange is preferably robust in case the channel characteristics of DSL communication link 214 are poor. Bi-phase shift keying (BPSK) modulation is preferably used to modulate multiple single-tone subcarriers that each carry the same data. The tones used are selected based on impairments likely to be present. The handshake can have many variations, but TU-R 114 and TU-C 122 should exchange a message that contains information about the their type and a number of related subparameters such as the frequency range and number of DMT subcarriers supported.

The second phase of initialization is transceiver training. In this phase, transceivers 200 and 206 acquire the DMT symbol stream, adjust their receiver gain, perform symbol timing recovery, and train any equalizers they may contain. There is an optional echo cancellation training step that can also be performed during this phase.

The transmitter power of transceivers 200 and 206 is initially set to a predetermined level during transceiver training to allow a preliminary estimate of loop attenuation by transceivers 200 and 206. The received upstream power spectral density (PSD) level is reported back to the TU-R 114, for example, via communications link 212 to allow limited power level adjustment, if needed, to meet spectral mask requirements. The training phase is conducted with all available upstream and downstream subcarriers modulated using.

In the third phase, transceivers 200 and 206 exchange capability information and perforin detailed channel characterization. For example, TU-C 122 may specify the minimum SNR margin for the DSL system and whether it can support functions such as trellis coding and echo cancellation. Similar information is exchanged by TU-R 114.

During this third phase, transceivers 200 and 206 both attempt to measure specific channel characteristics such as unusable subcarriers, loop attenuation on a per subcarrier basis, SNRs, and any other channel impairments that would affect the potential transmitted bit rates.

In an embodiment where multiple orthogonal subcarriers are used, each subcarrier can be assigned a modulation format (e.g., number of bits per subcarrier) and relative gain independently. TU-C 122 assigns bits and gains for the downstream spectrum while TU-R assigns bits and gains for the upstream spectrum. The last part of the exchange phase is a synchronized transition from the BPSK and QPSK used during initialization to the QAM modulation assigned during the data exchange phase. At the conclusion of the initialization steps, the system is ready to pass higher-layer traffic.

As described in detail below, it is a feature of the present invention that it provides a toolbox of methods and techniques for mitigating the effects of noise in xDSL systems. These methods and techniques are controllable and locatable at one or both ends of DSL communication link 214 (e.g., within TU-R 114 and TU-C 122). These novel methods and techniques include: (1) per tone noise margin modification, (2) framer constraints modification, (3) improved noise measurements; (4) more robust on-line reconfiguration processes, (5) worst case mean noise monitoring, (6) induced bit rate limitations, and (7) distortion noise mitigation. The source(s) of information used with these novel noise mitigation methods and techniques come from noise mitigation engine 202 or noise mitigation engine 208, which can each monitor noise impulsivity, from average power values, from locally provided settings (e.g., set by a modem vendor), or from noise mitigation controller 204 or noise mitigation controller 210.

In the per tone noise margin modification method of the present invention, TU-R 114 and TU-C 122 each measure the impulsive noise nature of the noise (e.g., using noise mitigation engines 202 and 208) during at least a portion of the initialization process described above using a medley signal on a per bin basis. This method then applies a margin correction to mitigate the effect of the noise impulsivity. In an embodiment, TU-R 114 and/or TU-C 122 may measure the impulsivity of the noise using signals other than a medley signal such as, for example, a reverbs signal or a quiet signal. Optionally, either TU-R 114 and/or TU-C 122 may disable (or not disable) this behavior independently.

In an embodiment, TU-R 114 uses a per-tone additional per tone margin pattern that is either programmed locally or communicated to TU-R 114 by TU-C 122. This pattern data is stored, for example, in a tone data table such as tone data table 323. Using this data, TU-R 114 is able to compute an effective tone dependent target margin. A predefined (empty) command can be used to disable the behavior at TU-R. Employing per tone margin control is preferable to using a target margin that is given for an entire frequency band, which cannot take into account frequency localization of some noises.

In an embodiment, there are multiple sources for the additive per tone margins stored in tone data table 323. A first source is an externally defined table, defaulting to a zero-filled table. An example application in which this is useful is where a circuit board supply has identified frequency domain noise issues such as, for example, distortion during production. In this example case, per tone corrections can be determined and stored in the external table. A second source is values obtained during the last data exchange phase or showtime (e.g., values stored in a retrain controller object). The use of this source may be controlled explicitly, for example, in the physical layer by an enable/disable control bit. The way this additional target per tone target margin is stored can be implementation specific, based on the results of an autonomous impulsivity measurement. A third source is an autonomous determination of the additional margin to be used, done during training in the initialization process. This can be based on the average noise, the peak noise, and the probability that the excess threshold of the noise distribution sigma (e.g., TrainingPlnThresholdEquivalentSigma) was exceeded. The quantities are measured by the same impulsivity primitives used in showtime. In an embodiment, the use of this source may also be controlled by a control bit. As will be understood by persons skilled in the relevant art(s) given the description herein, other sources are also possible, and thus the present invention is not to be limited to just these example sources.

In an embodiment, table 323 is built using two additional impulsivity measurements made during training. Table 1 below provides example pseudo-code that illustrates one way to due this. In the example pseudo-code, threshold, classes and additive margin level may be implementation specific and/or specific to TU-R 114.

TABLE 1

If enabled,
   If Prob-ExcessThresholdPeakImpulseNosie
   (tone)>Threshold_do_add_margin or forced,
      additiveTargetMargin (tone) += addMarginPeakImpulseNoise [Class
      [peak_noise (tone) ] ]
   else
      additiveTargetMargin (tone) += addMarginPeakImpulseNoise [Class
      [peak_noise (tone) ] ]

Another source for the additive per tone margins data is from a table residing within TU-C 122. In an embodiment, a request is made to TU-C 122 by TU-R 114 for the data. The request can be made using an interface field.

In an embodiment, the default behavior for TU-R 114 is that it uses the maximum of the available sources as additional margin. In an embodiment, TU-C 122 may disable any of these sources (e.g., using an interface field) in order to make sure that data from a table within TU-C 122, which TU-C 122 provides to TU-R 114, is used. A vendor of TU-R 114 can provide a user with access to the control bits through a dedicated control interface (e.g., a GUI or a CLI). This will indicate to TU-R 114 control logic that it to use locally enabled impulsivity measurements from either showtime or training to compute per tone additional margin.

In an embodiment, TU-C can also apply the same principle described here to its own margin allocation.

In an embodiment, one or more control bit(s) are provided that can be used to prevent TU-R 114 or TU-C 122 from using any of the noise mitigation methods and techniques described herein. In another embodiment, the bit(s) are used to enable selected noise mitigation methods and techniques while disabling other.

In the framer constraints modification method of the present invention, TU-R 114 and/or TU-C 122 measure broadband impulsivity characteristics during the initialization process and derive additional constrain(s) for the receiver framer. In an embodiment, the addition constrain(s) relate to increased minimum impulse noise protection (INP), lower maximum delay, and control of the use of trellis coding. These constrain(s) are a function of the impulsivity measurements. This method provides an improvement for all impulse noise processes, whether being repetitive or not. Those that are repetitive with a high repetition frequency are captured using a medley signal.

In an embodiment, TU-R 114 use peak line noise information measured during the initialization process for framing parameter improvements. This induces a behavior such that TU-R 114 takes into account the impulsivity of the noise explicitly in the framer algorithm, giving the preference to impulse noise resistance to other aspects such as bit rate. Both TU-C 122 and TU-R 114 may negotiate longer than normal medley signal durations. In an embodiment, this longer duration is configurable in TU-C 122 (e.g., using a human machine interface) and is transmitted to TU-R 114 for use (e.g., using an interface field).

In an embodiment, TU-R 114 noise mitigation engine 208 is capable of deriving additional framer constrains from a previous showtime or from impulsivity measurements performed during training. Noise mitigation engine 208 obtains broadband histograms of both inter-arrival and impulse duration during training or during a previous showtime, for controlling TU-R 114. The duration bins preferably have a one symbol resolution and go up to 32. The inter-arrival bins preferably correspond to a period corresponding to integer values of milliseconds. The margin decrease levels are set to specified levels (e.g., PerToneMarginDecreaseLevelPeakImpulseNoiseTraining) for the per-tone threshold and for the broadband threshold (e.g., Broadband/MarginDecreaseLevelPeakImpulseNoiseTraining).

In an embodiment, TU-R 114 noise mitigation controller 210 has two behaviors. The first behavior is to use locally defined TU-R 114 values for the maximum interleaving delay, the minimum impulse noise protection value, and the trellis coding. The second behavior uses the broadband histograms obtained during the last showtime and stored in a retrain controller object. This behavior is based on a measurement of impulsivity histograms of broadband noise events measuring the distribution of the broadband pulse durations and the broadband pulse inter-arrival times. The impulsivity showtime functions are preferably reused during medley.

In an embodiment, if the above method is not disabled by TU-C 122 (e.g., using an interfacing field), the operation of TU-R 114 is effected based on inter-arrival statistics. For example, let P1 be the probability of observing inter-arrival times corresponding to values of the delay in milliseconds lower than a negotiated maximum delay. If P1 is higher than a threshold percent (e.g., AggregateInterArrival/DelayChangeThreshold), the framing algorithm uses a value of the maximum delay such that a threshold percent (e.g., IADelayChangeFraction*AggregateInterArrival/DelayChangeThreshold) of the pulses observed have an inter-arrival time between this value and a negotiated value of the maximum delay. All other inter-arrival time observations are below the chosen maximum delay.

The impulse noise protection minimum value preferably used is the duration for which a threshold percent (e.g., AggregateDurationThreshold) of the broadband pulse events observed are strictly shorter. This value is used in preference to the negotiated minimum impulse noise protection value, but only if the minimum downstream bit rate is lower than the maximum feasible rate at that impulse noise protection value, and if this feature is not disabled by TU-C 122 to avoid a configuration not possible. An impulse noise protection value resolution of one is implemented in the framing algorithm.

In an embodiment, if the number of detected pulses is above a predetermined percent (e.g., AggregatePulseRateForTrellisOff), TU-R 114 request no down stream trellis coding. In an embodiment, downstream trellis coding can be configured through an interface field by TU-C 122 directly.

In the improved measurements method of the present invention, both TU-R 114 and TU-C 122 may negotiate a longer medley signal duration for improved robustness of the impulse noise measurement. Based on a previous showtime, both entities may require a longer medley signal, within limits, to confirm that the detected impulsivity measurements are still present and confirm that it may be desirable to apply ad-hoc noise mitigation methods. This extension applies for those noises that are repetitive enough to be measurable during an extended medley signal. In an embodiment, these measurements are done during a loop diagnostics mode where a long medley signal is sent and where additional messages (e.g., R-LD-x and C-LD-x in an ADSL2 embodiment) are exchanged to communicate measurement results.

In an embodiment of the present invention, TU-R 114 adjusts its behavior base on worst-case line noise in showtime. This feature permits TU-R 114 to take into account the impulsivity and the time variance of the noise explicitly during showtime, giving preference to impulse noise resistance over other aspects such as bit rate. This induces the on-line reconfiguration mechanisms to keep higher margin on those tones where high impulsivity level is detected.

In an embodiment, TU-R 114 performs worst-case noise monitoring. In this embodiment, TU-R 114 maintains a worst case per tone noise table. These noise values are not a peak impulse noise value, but an average value of the noise, as measured during the SNR showtime estimation. The initial value of the worst case noise may be programmed into TU-R 114, in order to prevent the physical layer program code from artificially limiting the measured SNR and the bit allocation. This is particularly useful to avoid the influence of frequency dependent board noise when components introducing distortion-originated impulses are used, or to complement the line-length dependency of transmit noise protection from TU-C 122.

In an embodiment, the difference between worst case line noise and initial quite line noise is preferably averaged over the usable band to compute the allowable average target margin lowering. The update of the worst case noise is enabled or disabled through a control bit. If the update is disabled, the initial value is permanently used as the minimal value of the noise power. TU-C 112 is able to reset the worst case noise monitoring during showtime using an embedded operations channel command extension that may be implementation specific. In such a case, the TU-C 122 transmitted table is max-ed to the initial value. The update can also be controlled by TU-C 122.

In an embodiment, the bit swap algorithm takes into account the worst case noise on each tone to perform new bit and gain allocations. If the average target margin lowering is less than the threshold communicated by TU-C 122 (the default value being target margin–min margin+AdditionalTargetMarginRelaxationForBitswap dB), the bit swap is performed. If the average target margin lowering level is higher than the communicated threshold, TU-R 114 induces a retrain and uses worst case noise during the retrain in preference to the quite line noise measured during initialization. The amount of available average margin can be increased by TU-C by either increasing the target margin or by using an interface field based additional target margin field.

In an embodiment, a seamless rate adaptation (SRA) algorithm takes into account the worst case noise on each tone to perform new bit and gain allocations. If an increase of the target margin was set by TU-C 122, however, it is maintained when the seamless rate adaptation algorithm is performed. This behavior can be controlled by TU-C 122 using enable/disable commands.

As noted above, it is a feature of the present invention that it provides more robust on-line reconfiguration processes. These improvements include, for example, if repetitive impulse noise detection is enabled, downstream full-band bit swap and seamless rate adaptation are limited to non-segmented requests, and providing overhead message doubled bit swap confirmations. These features lower the errored seconds count and lower the probability of further stability degradation, if peak line noise is detected.

In an embodiment, on-line reconfiguration is based on autonomous peak line noise detection. The principle of this feature is that when triggered by an excessive error rate of a predetermined number of errored seconds (e.g., PercentageOfESToTriggerOLR) within a predetermined period of time (e.g., AutonomousPeakImpulseNoiseTriggerMonitorError), an autonomous peak line noise measurement is started. If a significant peak line noise level is found, an equivalent target margin per tone is computed and is used in a subsequent on-line reconfiguration (e.g., either bit swaps or seamless rate adaptation).

A bit swap is applied upon detection of a sync symbol phase inversion. In an environment where impulse noise is present, there is a significant probability that a bit-swap acknowledge is missed by the receiving part, or that a bit-swap acknowledge is wrongly detected earlier than the effective bit sway. This will led to errors being made until the effective requested bit swap is made, and it will make local error monitoring and the adaptive algorithm biased.

When TU-R 114 or TU-C 122 has detected impulse noise events exceeding predetermined value (e.g., threshold1), it activates an overhead channel based bit swap confirmation mechanism. The on-line reconfiguration requests are limited to using non-segmented overhead messages. In an embodiment, this requires a bit swaps through the on-line reconfiguration value or-ed with 0x20. This means that a confirmation is expected through the statement overhead channel. The responding party (TU-C 122 or TU-R 114) responds through the overhead channel with a reason code 0x20 that the bit swap is accepted. If the requesting party (TU-R 114 or TU-C 122) receives this confirmation, it replies with the same on-line reconfiguration message and applies the bit-swap at super-frame following the time-out. If the demanding party receives a reason code different than 0x20, it reverses the applied bit-swap if a sync symbol inversion was detected. This feature is used if both TU-C 122 and TU-R 114 indicate they support this feature (e.g., in an interface frame).

In the worst case mean noise monitoring method of the present invention, TU-R 114 retains worst case noise during showtime to perform seamless rate adaptation. This can be controlled by TU-C 122. TU-R 114 also retains worst case noise during showtime to perform bit swaps, which is also controllable by TU-C 122. TU-C 122 is able to indicate to customer premises equipment to take additional target margin to cope with strongly varying noise. This feature of the present invention allows the on-line reconfiguration mechanisms to learn the envelope of the external noise variations, such as the crosstalk noise variation, and adapt either the bit rate if seamless rate adaptation is enabled, or the bit swaps. It is to be noted that the envelope of these noise variations will extend over a time-frame of about 24-hours, and can deal with the 7 PM-crosstalk phenomenon, i.e. the fact that broadband usage peaks at some hours of the day.

In an embodiment, TU-C 122 and TU-R 114 use worst case echo noise to limit the effects of distortion. The principle of this mitigation technique is to use a high crest factor transmit signal when the echo noise proper is measured. This echo noise power is stored and compared to the medley noise power used to compute the medley signal-to-noise ratio per bin. The echo noise power is an average measure, and not a peak measure. If the high crest echo noise is higher than the medley noise, the former is used to compute the medley signal-to-noise ratio. This approach guarantees that the bit allocation is such that distortion noise will not cause error events in the downstream spectrum. The values of the high crest echo noise are also compared to the initial worst case noise values, and they are used if higher than them, on a per bin basis. As with other features of the present invention, this behavior can be controlled by an enable/disable control kit.

In the induced bit rate limitations method of the present invention, TU-C 122, for example, adds transmit noise during the initialization process to induce a bit rate limitation at TU-R 114. This feature allows TU-C 122 to inject noise at the transmit side and obtain an effect that is totally controlled at the central office side.

In the distortion noise mitigation method of the present invention, TU-C 122 or TU-R 114 takes into account the echo noise measured with a high crest factor transmit signal as lower limit for medley noise.

While various embodiments of the present invention have been described above, it should be understood that they have been presented by way of example, and not limitation. It will be apparent to persons skilled in the relevant art(s) that various changes can be made therein without departing from the scope of the invention. Furthermore, it should be appreciated that the detailed description of the present invention provided herein, and not the summary and abstract sections, is intended to be used to interpret the claims. The summary and abstract sections may set forth one or more but not all exemplary embodiments of the present invention as contemplated by the inventors.

What is claimed is:

1. A digital subscriber line transceiver unit, comprising:
a noise mitigation engine having a port configured to couple to a digital subscriber line, wherein the noise mitigation engine is configured to apply a correction to mitigate an effect on data bits by time-varying noise present on the digital subscriber line, wherein the noise mitigation engine is further configured to derive, from measured impulsivity characteristics of the time-varying noise, framer constraints related to one or more of increased minimum impulse noise protection and lower maximum delay; and
a noise mitigation controller coupled to the noise mitigation engine.

2. A digital subscriber line transceiver unit, comprising:
a noise mitigation engine having a port configured to couple to a digital subscriber line, wherein the noise mitigation engine is configured to apply a correction to mitigate an effect on data bits by time-varying noise present on the digital subscriber line, wherein a duration of a medley signal for characterizing the time-varying noise is extendable to confirm a previously determined impulsivity measurement of the time-varying noise; and
a noise mitigation controller coupled to the noise mitigation engine.

3. A digital subscriber line transceiver unit, comprising:
a noise mitigation engine having a port configured to, couple to digital subscriber line, wherein the noise mitigation engine is configured to apply a correction to miti- gate an effect on data bits by time-varying noise present on the digital subscriber line, wherein the noise mitigation engine is configured to use, on a per-tone basis, a table of worst case average values of the time-varying noise, the tones being used to transmit the data bits; and
a noise mitigation controller coupled to the noise mitigation engine.

4. The digital subscriber line transceiver unit of claim 3, wherein the time-varying noise is an impulse noise.

5. A digital subscriber line transceiver unit, comprising:
a noise mitigation engine having a port configured to couple to a digital subscriber line, wherein the noise mitigation engine is configured to apply a correction to mitigate an effect on data, bits by time-varying noise present on the digital subscriber line, wherein the noise mitigation engine is configured to determine an envelope of variations of the time-varying noise and to adapt a bit rate based on the determined envelope when seamless rate adaptation is enabled; and
a noise mitigation controller coupled to the noise mitigation engine.

6. The digital subscriber line transceiver unit of claim 4, wherein the envelope of variations of the time-varying noise extends over a time-frame of 24-hours.

7. A digital subscriber line transceiver unit, comprising:
a noise mitigation engine having a port configured to couple to a digital subscriber line, wherein the noise mitigation engine is configured to apply a correction to mitigate an effect on data bits by time-varying noise present on the digital subscriber line, wherein the noise mitigation engine is configured to determine an envelope of variations of the time-varying noise and to adapt a bit swap algorithm based on the determined envelope of variations; and
a noise mitigation controller coupled to the noise mitigation engine.

8. A digital subscriber line transceiver unit, comprising:
a noise mitigation engine having a port configured to couple to a digital subscriber line, wherein the noise mitigation engine is configured to apply a correction to mitigate an effect on data bits by time-varying noise present on the digital subscriber line, wherein a second digital subscriber line transceiver unit is configured to add noise during an initialization process to induce a bit rate limitation in the digital subscriber line transceiver unit, when the digital subscriber line transceiver unit and the second digital subscriber line transceiver unit are coupled together via the digital subscriber line; and
a noise mitigation controller coupled to the noise mitigation engine.

9. A digital subscriber line transceiver unit, comprising:
a noise mitigation engine having a port configured to couple to a digital subscriber line, wherein the noise mitigation engine is configured to apply a correction to mitigate an effect on data bits by time-varying noise present on the digital subscriber line, wherein the noise mitigation engine is further configured to use a lower limit for medley noise based on a high crest factor transmit signal when the time-varying noise is echo noise; and
a noise mitigation controller coupled to the noise mitigation engine.

10. A method, comprising:
receiving, line a digital subscriber line transceiver unit, data bits on a digital subscriber line, the digital subscriber line transceiver unit including a noise mitigation engine;

applying a correction by the noise mitigation engine to mitigate an effect on data bits by time-varying noise resent on a digital subscriber line; and deriving from measured impulsivity characteristics of the time-varying noise, framer constraints related to one to more of increased minimum impulse noise protection and lower maximum delay.

11. A method comprising:

receiving, by a digital subscriber line transceiver unit, data bits on a digital subscriber line, the digital subscriber line transceiver unit including a noise mitigation engine; and applying a correction by the noise mitigation engine to mitigate an effect on data bits by time-varying noise present on a digital subscriber line, wherein applying a correction to mitigate an effect by time-varying noise includes applying a correction based on extending a duration of a medley signal for characterizing the time-varying noise to confirm a previously determined impulsivity measurement of the time-varying noise.

12. A method, comprising:

receiving, by a digital subscriber line transceiver unit, data bits on a digital subscriber line, the digital subscriber line transceiver unit including a noise mitigation engine; and applying a correction by the noise mitigation engine to mitigate an effect on data bits by time noise present on a digital subscriber line, wherein applying a correction to mitigate an effect by time-varying noise includes using, on a per-tone basis, a table of worst case average values of the time-varying noise, the tones being used to transmit the data bits.

13. The method of claim 12, wherein the applying a correction to mitigate an effect by time-varying noise further includes applying a correction to mitigate an effect by an impulse noise.

14. A method, comprising:

receiving, by a digital subscriber line transceiver unit, data bits on a digital subscriber line, the digital subscriber line transceiver unit including a noise mitigation engine; and apply a correction by the noise mitigation engine to mitigate an effect on data bits by time-varying noise present on a digital subscriber line, wherein applying a correction to mitigate an effect by time-varying noise includes applying a correction based on determining an envelope of variations of the time-varying noise and adapting a bit rate based on the determined envelope when seamless rate adaptation is enabled.

15. The method of claim 14, wherein the determining an envelope of variations of the time-varying noise includes determining an envelope of variations that extends over a time-frame of 24-hours.

16. A method, comprising:

receiving, by a digital subscriber line transceiver unit, data bits on a digital subscriber line, the digital subscriber line transceiver unit including a noise mitigation engine; and applying a correction by the noise mitigation engine to mitigate an effect on data bits by time-varying noise present on a digital subscriber line, wherein applying a correction to mitigate an effect by time-varying noise includes applying a correction based on determining an envelope of variations of the time-varying noise and adapting a bit swap algorithm based on the determined envelope of variations.

17. A method, comprising:

receiving, by a digital subscriber line transceiver unit, data bits on a digital subscriber line, the digital subscriber line transceiver unit including a noise mitigation engine; and applying a correction by the noise mitigation engine to mitigate an effect on data bits by time-varying, noise present on a digital subscriber line, wherein applying a correction to mitigate an effect by time-varying noise includes applying a correction based on adding noise, by a second digital subscriber line transceiver unit that is coupled to the digital subscriber line transceiver unit during an initialization process, to induce a bit rate limitation in the digital subscriber line transceiver unit.

18. A method, comprising:

receiving, by a digital subscriber line transceiver unit, data bits on a digital subscriber line, the digital subscriber line transceiver unit including a noise mitigation engine; and applying a correction by the noise mitigation engine to mitigate an effect on data bits by time-varying noise present on a digital subscriber line, wherein applying a correction to mitigate an effect by time-varying noise includes applying a correction to echo noise based on using a lower limit for medley noise based on a high crest factor transmit signal.

19. The digital subscriber line transceiver unit of claim 3, wherein the noise mitigation controller is in communication with a second noise mitigation controller, the second noise mitigation controller being a component of a second digital subscriber line transceiver unit that is coupled to the digital subscriber line transceiver unit via the digital subscriber line.

20. The method of claim 12, further comprising:

communicating, by the noise mitigation engine, with a noise mitigation controller over a communications link.

* * * * *

UNITED STATES PATENT AND TRADEMARK OFFICE
CERTIFICATE OF CORRECTION

PATENT NO. : 8,363,762 B2
APPLICATION NO. : 13/103336
DATED : January 29, 2013
INVENTOR(S) : Van de Wiel et al.

It is certified that error appears in the above-identified patent and that said Letters Patent is hereby corrected as shown below:

Column 13, Line 65, replace "to," with --to--.

Column 13, Line 66, replace "couple to" with --couple to a--.

Column 14, Line 14, replace "data, bits" with --data bits--.

Column 14, Line 64, replace "line a digital" with --by a digital--.

Column 15, Line 3, replace "resent" with --present--.

Column 15, Line 5, replace "one to" with --one or--.

Column 15, Line 26, replace "time noise" with --time-varying noise--.

Column 16, Line 20, replace "time-varying," with --time-varying--.

Signed and Sealed this
Second Day of April, 2013

Teresa Stanek Rea
*Acting Director of the United States Patent and Trademark Office*